UNITED STATES PATENT OFFICE.

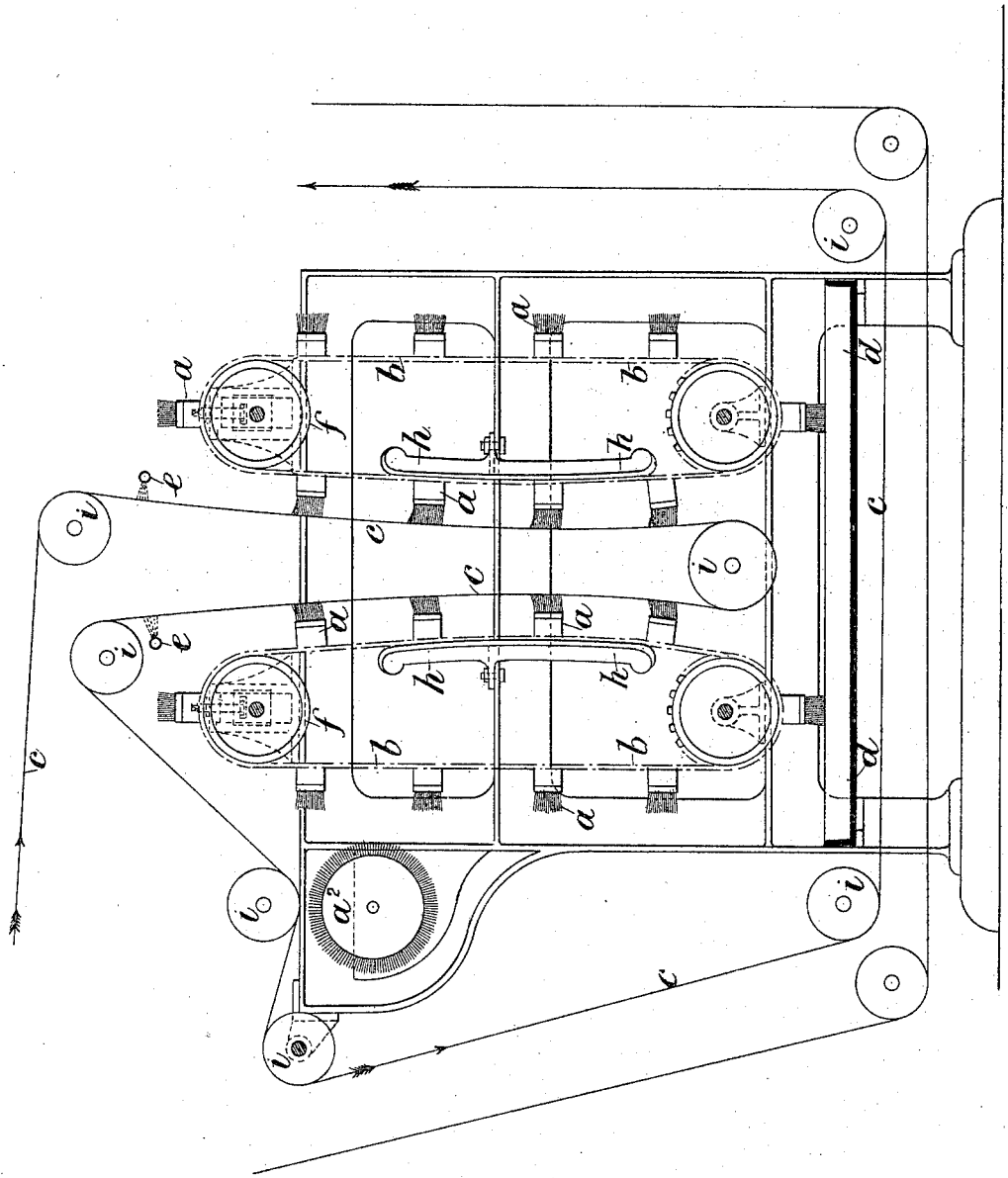

ROSS GEMMELL AND FREDERICK BUXTON, OF WHALEY BRIDGE, NEAR STOCKPORT, ENGLAND.

APPARATUS FOR WASHING PRINTERS' BLANKETS.

SPECIFICATION forming part of Letters Patent No. 572,889, dated December 8, 1896.

Application filed June 29, 1896. Serial No. 597,435. (No model.)

*To all whom it may concern:*

Be it known that we, ROSS GEMMELL and FREDERICK BUXTON, subjects of the Queen of Great Britain, residing at Whaley Bridge, near Stockport, in the county of Derby, England, have invented Improvements in Machinery for Washing Blankets Used on Printing or Padding Machines, of which the following is a specification.

The object of this invention is to construct apparatus for the more efficient washing of "leatherine" or other blankets used on printing or padding machines.

Our improved machine consists mainly of a number of transverse brushes or squeegees or their equivalent fixed to and running with endless chains and working against the side of the blanket which is to be washed. The chains are arranged to move vertically (or nearly so) and to draw the brushes (by preference downward) against the blanket and so to brush or sweep the dirt from the same into a suitable receptacle or receptacles beneath.

We may employ one, two, or more sets of chains and brushes, and each set of brushes is provided with a suitable perforated pipe for spraying the blanket with water or other cleansing fluid. The last set of brushes, squeegees, or their equivalent may, however, be used to dry the surface of the blanket.

Each pair or set of chains is provided with a suitable tightening-pulley, and they or the brushes or their equivalent also run in contact with suitable curved adjustable guiding-plates bearing against the inner surfaces thereof, which so deflect the brushes and the blanket that the former will act with greater efficiency against the face of the blanket. The latter passes around suitable tension and guide rollers to keep it tight and bring the surfaces to be cleansed into contact with the moving brushes.

The annexed drawing illustrates one way of carrying our invention into practice.

$a$ are the transverse brushes, fixed to and running with endless chains $b$ and working against the side of the blanket $c$ which is to be washed.

The chains are arranged, as shown, to move vertically (or nearly so) and to draw the brushes $a$ downward against the blanket $c$, and so to brush or sweep the dirt from the same into a suitable receptacle $d$.

Each set of brushes $a$ is provided with a suitable perforated pipe $e$ for spraying the blanket $c$ with water or other cleansing fluid, and we prefer to use a rotary drying-brush, as seen at $a^2$, to dry the blanket $c$ as it leaves the machine.

Each pair or set of chains $b$ is provided with a suitable tightening-pulley or its equivalent $f$, and the said chains $b$ (or the brushes) also run in contact with suitable curved adjustable guiding-plates $h$, bearing against the inner surfaces thereof, which so deflect the brushes $a$ and the blanket $c$ that the former will act with greater efficiency against the face of the blanket $c$. The latter passes around suitable tension and guide rollers $i$ to keep it tight and bring the surface to be cleansed into contact with the downwardly-moving brushes $a$.

The apparatus may be driven directly from the printing-machine in connection with which it is worked, or the endless chains carrying the brushes may be driven independently, as from a line-shaft, the latter arrangement providing for the thorough cleansing of the blanket while the printing-machine is slowly turning around or stopped.

We claim as our invention—

1. In apparatus for washing blankets used on printing or padding machines, the combination of an endless chain, provided with brushes or their equivalents adapted to be drawn by the motion of the chain against the surface of the blanket to be washed, with perforated spray-pipes for spraying the blankets, and means for presenting the blanket to the brushes, all substantially as set forth.

2. In apparatus for cleansing blankets, the combination of guide and tension rollers over which the blanket passes, with an endless chain provided with brushes or their equivalents and adjustable guiding-plates, substantially as and for the purposes set forth.

3. In apparatus for cleansing blankets, the combination of guide and tension rollers over which the blanket passes, with endless chains provided with brushes adapted to move downward against the surface of the blanket, spray-pipes, and a receptacle beneath the brushes, all substantially as and for the purposes set forth.

In testimony whereof we have signed our names to this specification in the presence of two subscribing witnesses.

ROSS GEMMELL.
    FREDERICK BUXTON.

Witnesses:
 CHARLES A. DAVIES,
 JNO. HUGHES.